United States Patent [19]

Fortune

[11] 4,056,334
[45] Nov. 1, 1977

[54] VACUUM SYSTEM

[76] Inventor: William S. Fortune, 14250 Dearborn St., Panorama City, Calif. 91402

[21] Appl. No.: 576,612

[22] Filed: May 12, 1975

[51] Int. Cl.² ............................................. F04F 5/52
[52] U.S. Cl. ......................................... 417/189; 92/7
[58] Field of Search .............. 417/182, 187, 188, 189, 417/210, 183, 184; 92/7; 251/75

[56] References Cited

U.S. PATENT DOCUMENTS

| 1,014,729 | 1/1912 | Thurman et al. | 417/189 |
| 1,265,928 | 5/1918 | McClymont | 417/189 |
| 1,357,960 | 11/1920 | Cruse | 251/75 X |
| 1,421,841 | 7/1922 | Schmidt | 417/189 X |
| 1,441,651 | 1/1923 | Anderson et al. | 417/189 |
| 2,043,027 | 6/1936 | Beede | 417/188 |
| 2,457,388 | 12/1948 | Lung | 417/189 |
| 3,055,225 | 9/1962 | Miller | 251/75 X |
| 3,435,841 | 4/1969 | Williams et al. | 417/189 |
| 3,765,505 | 10/1973 | Pendleton | 417/312 X |

FOREIGN PATENT DOCUMENTS

| 488,394 | 12/1929 | Germany | 417/189 |
| 344,034 | 7/1935 | Italy | 417/189 |

Primary Examiner—William L. Freeh
Assistant Examiner—Edward Look
Attorney, Agent, or Firm—Daniel T. Anderson

[57] ABSTRACT

A vacuum pump having a mechanically operated plunger or piston which is so arranged as to either fully open or fully close a supply of compressed gas. The compressed gas flows through a venturi tube to create a vacuum. This vacuum in turn causes the atmospheric pressure to urge the plunger against a spring force to close the connection between the compressed gas and the venturi tube. This will maintain the vacuum pressure between two predetermined limits. As soon as the pressure in the vacuum chamber rises above a predetermined value the compressed gas supply is opened again to reduce the gas pressure in the vacuum chamber. There are also disclosed a new desoldering tool, a power cylinder, clamping fixtures and suction cups operable with the vacuum pump of the invention.

16 Claims, 10 Drawing Figures

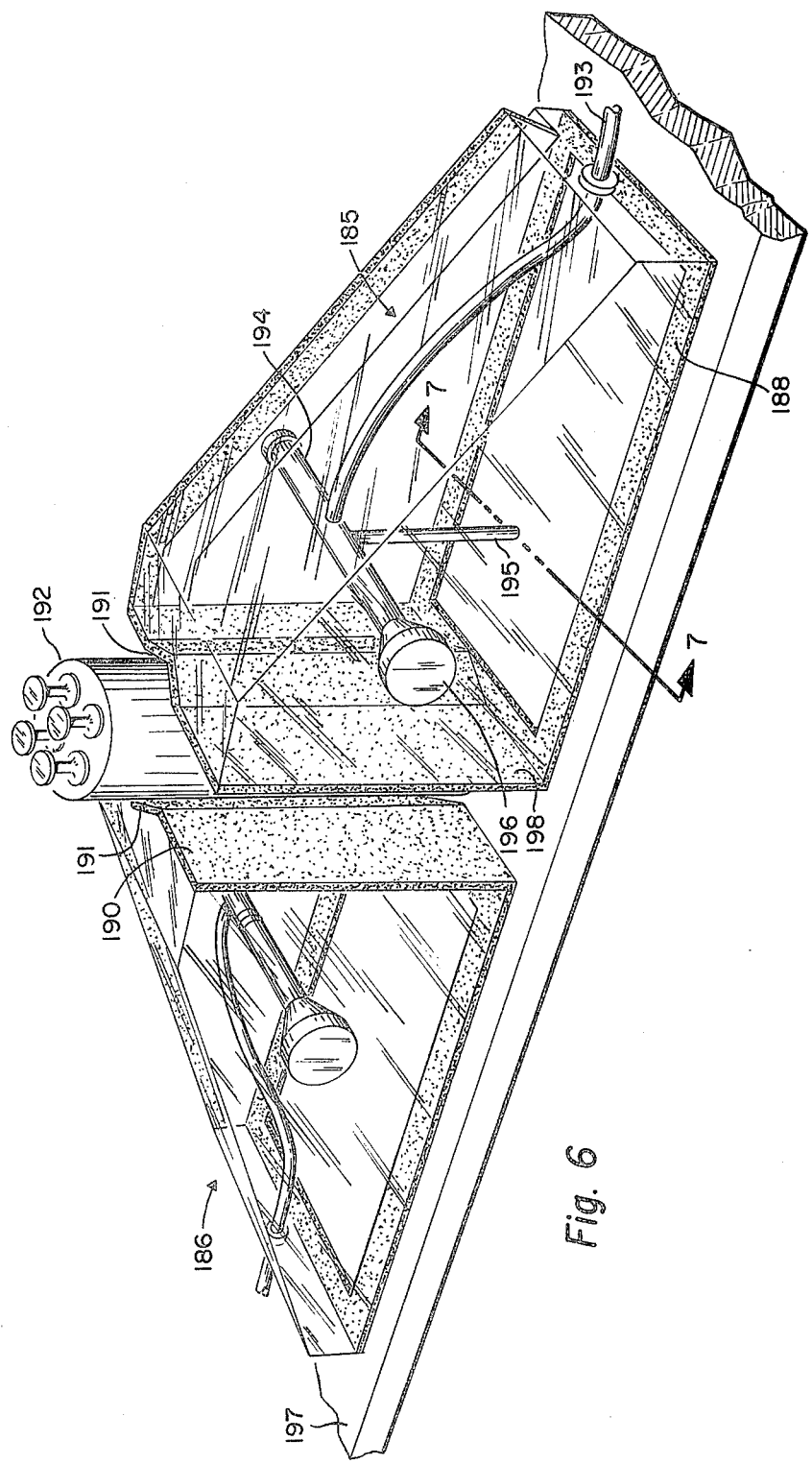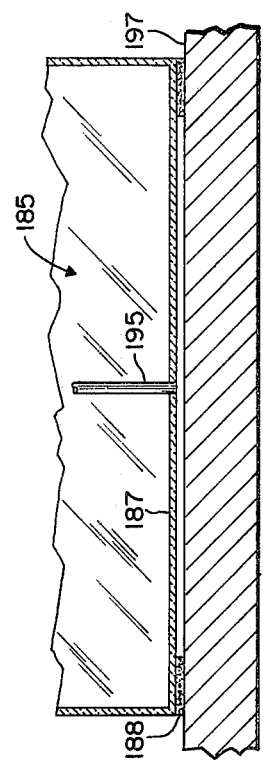

VACUUM SYSTEM

BACKGROUND OF THE INVENTION

This invention relates generally to vacuum systems and particularly relates to a vacuum pump of the type having a venturi tube and associated equipment such as a desoldering instrument, vacuum clamping fixtures, a power cylinder and vacuum operated suction cups.

Many types of vacuum pumps are known in the art. A very efficient type of vacuum pump is operated by a supply of compressed gas such as air. The compressed air is caused to flow through a venturi tube which creates a reduced pressure at its throat to provide the desired vacuum. Such a pump has been disclosed in the patent to Thurman et al. U.S. Pat. No. 1,014,729. The pump includes a valve which is designed to create a steady state according to a varying vacuum load. Thus the valve will control the amount of compressed air fed into the pump. Accordingly, the valve is either completely turned off or remains partially open during operation to control the flow of compressed air. This is effected by utilizing two preset limit valves.

The disadvantage of such a system is that it requires a continuous supply of compressed gas, thus wasting the compressed air. As a result, this type of pump is not suited to provide a compact, portable system including a compressed air supply and a vacuum pump. A somewhat similar vacuum pump has been disclosed in the patent to Des Rocher U.S. Pat. No. 1,187,719. In other words, in this pump the valve is never completely on or completely off. The pump disclosed in the patent to Lung U.S. Pat. No. 2,457,388 is never completely closed.

It is accordingly an object of the present invention to provide a vacuum system including a vacuum pump where the vacuum is generated by a venturi tube and which is characterized by an on-off operation.

A further object of the present invention is to provide a vacuum pump of the type discussed capable of maintaining a reduced pressure between two preset limits whereby the pump begins to operate when the pressure exceeds a certain upper limit and stops when the pressure has reached a certain lower limit.

Another object of the present invention is to provide a vacuum system as previously discussed which is small and efficient and which can be operated by a portable compressed gas supply along with a portable pump.

Still a further object of the present invention is to provide a vacuum system as previously described which includes various attachments such, for example, as a vacuum desoldering tool, a power cylinder, clamping fixtures and vacuum operated suction cups.

Still another object of the present invention is to provide a vacuum system including a vacuum pump and a vacuum operated desoldering tool or a desoldering attachment for a soldering instrument.

Yet a further object of the present invention is to provide a vacuum system including a vacuum pump and a power cylinder having a single piston which is not spring biased and a single connection to a vacuum and a compressed air supply.

Yet another object of the present invention is to provide a vacuum system including a vacuum pump and a pair of clamping fixtures for clamping a component and which may be moved on a work bench and secured thereto by the action of the vacuum.

Yet a further object of the present invention is to provide a vacuum system including a vacuum pump and vacuum operated suction cups which may be utilized for permitting a worker to walk on slippery surfaces and which are controlled by a motion sensor.

SUMMARY OF THE INVENTION

A vacuum system in accordance with the present invention includes a vacuum pump which comprises a venturi tube. Means are provided including a passageway for supplying compressed gas to the venturi tube. The pump further includes a vacuum chamber as well as conduit means for exhausting the air from the vacuum chamber and connected to the venturi tube. Piston means is disposed in the vacuum chamber and is capable of moving from one end position to the other.

The piston means has a portion capable of opening and closing the passageway to permit or prevent the compressed gas from entering the venturi chamber. Spring means is associated with the piston means and disposed in the housing for urging the piston into one end position and against the action of the vacuum.

Hence an existing vacuum tends to urge the piston in the other end position, thereby to close off the supply of compressed gas. Finally, means are coupled to the piston means for causing the piston means to rapidly snap from one end position to the other. This will prevent the piston from partially opening or partially closing the passageway interconnecting the gas supply with the venturi tube.

The additional attachments which may be used with the vacuum pump of the invention will be subsequently discussed.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 6 is a view in perspective of a pair of clamping blocks or fixtures for securely gripping a component and which may be secured to a bench top by the action of a vacuum;

FIG. 7 is a cross-sectional view taken on line 7—7 of FIG. 6 to illustrate particularly the seal provided for each of the clamping fixtures;

DESCRIPTION OF THE PREFERRED EMBODIMENTS

Figure 1:
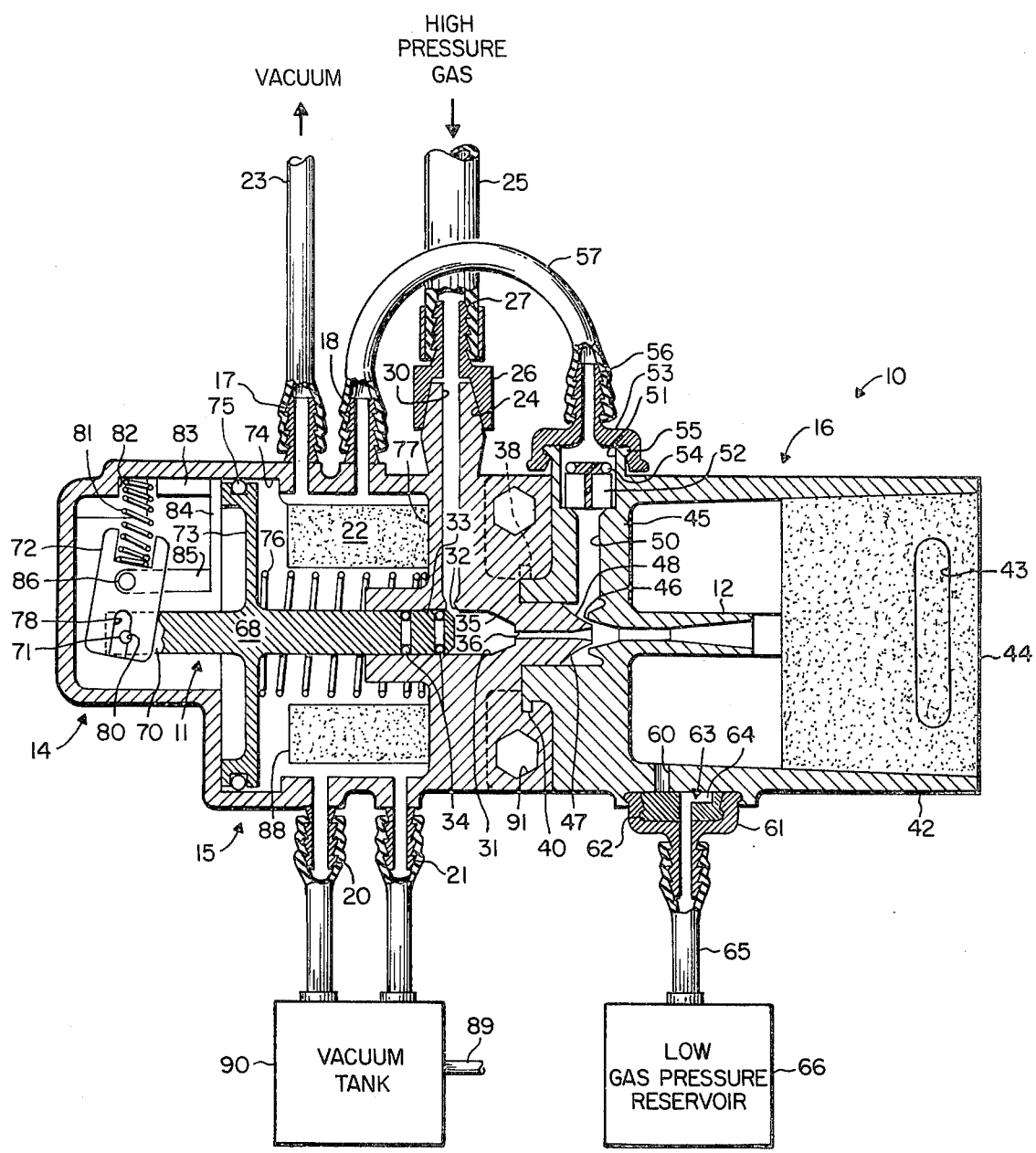
FIG. 1 is a cross-sectional view of a preferred embodiment of a vacuum pump embodying the present invention.

Referring now to the drawings wherein like elements are designated by the same reference numbers and particularly to FIG. 1, there is illustrated a preferred embodiment of a vacuum pump embodying the present invention and forming part of the vacuum system of the present invention. The vacuum pump of FIG. 1 includes a housing generally designated at 10 within which moves a control element or plunger 11 and further including a venturi tube 12. The housing 10 may, as illustrated, be made in three parts and may include a plunger cap 14, a plunger housing 15 and a muffler portion 16. The purpose of the vacuum pump of FIG. 1 is to utilize compressed air to generate a vacuum. In addition, the compressed air having passed the venturi tube 12 is converted into a gas or air at a relatively low pressure so that both a vacuum and a low pressure gas are available.

The pump is so arranged that it will automatically block the supply of high pressure air when a vacuum of predetermined pressure has been obtained. The pump is provided with an automatic control to apply compressed air again when the pressure in the vacuum reservoir has risen to another predetermined value. Therefore, the vacuum is maintained between two limits by a demand action. The operation may be described as a variable pulse width modulation system, that is a system where the time duration of the on and off operation varies in accordance with demand.

Before further explaining the operation of the pump of the invention the structure of the pump of FIG. 1 will now be described in some detail.

The plunger housing 15 consists of a generally cylindrical outer body having, for example, four outlets 17, 18, 20 and 21 connected to the interior which forms a plenum 22. The outlets 17, 18, 20 and 21 are each provided with an outer serrated nipple for connection to a suitable hose such as a hose 23 to provide a vacuum at a desired work place. The hose 23 may consist of a suitable plastic material which is flexible. It need not necessarily be able to withstand atmospheric pressure and may be allowed to collapse due to the ambient air pressure. It will, of course, be obvious that more or less than the four nipples 17, 18, 20 and 21 may be provided. The plunger housing 15 is also provided with an apertured conical inlet 24 by means of which the high pressure air or gas may be supplied through a flexible hose 25. The hose 25 should be able to withstand the high pressure which may amount to 80 - 100 psi (lbs. per square inch). The conical end 24 may be threaded for receiving a coupler element 26 which in turn is connected to the high pressure hose 25 and which may have a serrated nipple 27 to which the hose is secured.

The radially extending inlet 24 has a bore 30 which is connected to an axial bore 31 in the plunger housing 15. The bore 30 is connected to the axial bore 31 through a reduced portion 32 which interconnects the high pressure hose 25 to the bore 31 and which can be opened and closed by the forward portion 33 of the plunger 11 which is sealed on either end by two O-rings 34. The bore connects to a conical opening 35 which has a much reduced central cylindrical opening 36 connected in turn to the venturi 12. The plunger housing 15 may be provided at its rear end with suitable internal holes not shown in FIG. 1, for receiving self-tapping screws to secure the plunger cap 14 to the plunger housing 15. Finally, the plunger housing 15 is provided with recesses 38 which cooperate with correponding projections 40 in the venturi 16 to provide a bayonet lock to lock the venturi or muffler housing 16 to the plunger housing 15.

Turning now to the description of the muffler and venturi housing 12, it will be seen that this housing portion consists of a forwardly open cylindrical portion or manifold 42 provided with a slot or hole 43 in its side wall. The open end of the cylinder 42 is closed by a muffler material 44 to dampen noise created by the intermittent operation of the pump. The slot 43 serves the purpose to receive a portion of the muffler material 44 so as to prevent its being blown out of the open cylinder 42. The manifold 42 may be connected to the outside of a room to ventilate the fumes and the like which may be sucked up by the vacuum. This will keep the room clean and free of obnoxious gases.

The rear end of the muffler housing 16 is closed by a disk-like structure 45 which in turn carries the venturi tube 12. The rearward end 46 of the venturi tube 12 is spaced from the front end 47 of the plunger housing 15 and from its bore 36 to provide an opening 48 through which air can escape from a bore 50 to the venturi tube 12, thus creating a vacuum in a manner well understood. In other words, the venturi tube 12 has a reduced portion or throat through which the compressed gas or air must flow at an increased speed and reduced pressure. This reduced pressure in turn will cause air to flow through the opening 48 into the venturi tube 12 thus creating a vacuum in the bore 50.

The bore 50 in turn has an enlarged cylindrical portion 51 in which is provided a check valve 52 which is capable of sealing the bore 50 against a connector element 53 by means of the O-ring 54. The connector element 53 snaps over the outwardly bulging ring 55 at the end of the housing portion 16 and again has a serrated nipple 56 for connection to a hose 57. The hose 57 should also consist of a material capable of withstanding the air pressure. Hence the hose 57 should be relatively rigid to resist collapse due to the air pressure and to provide a fast response time. It serves the purpose to interconnect the plenum 22 with the bore 50 so as to create a vacuum in the plenum 22. It will be understood that the projections 40 at the rearward end of the muffler housing 16 which create a bayonet lock, extend on both sides through a predetermined angle so that the two parts can be connected and locked by rotating one against the other.

After the high pressure air has passed the venturi tube 12 it has a relatively low pressure such as say 2 - 6 psi. This air may be obtained through an aperture 60 in the cylinder 42 which connects to a connector 61 which may be identical to the connector 53 and which is snapped over an outwardly bulging portion 62 of the housing 42. The connector 61 is provided with a hole 63 having an eccentric portion 64 which can be connected to the bore 60 by rotating it. This will permit to control the size of the opening between the interior of the cylinder 42 and a flexible hose 65 from which the low pressure air can be obtained. This can be stored in a reservoir 66 schown schematically. This regulated output air can be utilized for many purposes.

Having now described the three housing portions 14, 15, and 16, the control piston or plunger and its function will now be described. As explained before, the plunger 11 has a forward or control portion 33 for either opening or closing the opening 32 which connects to the compressed air supply. The plunger 11 is provided with a cylindrical central shaft 68 which is integral with the control portion 33. The rearward portion 70 is provided with a small metal pin 71 which cooperates with a trip cam 72. Finally the plunger 11 has a disk-like portion 73 which slides within the cylindrical opening 74 of the plunger housing 15 and is sealed by an O-ring 75. A main spring 76 bears against one surface of the disk 73 and against the front wall 77 of the plunger housing 15.

The trip cam 72 is of fork-like construction and has a generally U-shaped opening 78 in both of its end portions in which the plunger shaft 71 can move. It is provided on its forward side with a semicircular detent 80 which helps the snap action provided by the trip cam 72 and its spring load 81. The spring 81 is loaded in compression and disposed between the cylindrical wall 74 of the plunger cap 14 and the top portion of trip cam 72. The spring 81 is pressed against a shoulder 82 in the plunger cap by a projection or retaining leg 83 forming part of the plunger cap 14 and which is secured to a semicircular disk 84. The disk 84 additionally has two rearwardly projecting retaining legs 85 spaced from retaining leg 83 and through which extend outwardly projecting pins 86 about which the trip cam 72 is capable of pivoting. The pins 86 preferably form part of the trip cam 72 and are molded integral therewith.

A foam-like filter 88 of annular shape may be provided in the plenum 22 for retaining particles such as solder which may have been sucked in by one of the hoses such as 23.

By way of example, the muffler housing 16 may consist of a clear plastic such as a polycarbonate which is sold in the trade under the name Lexan. The connector 53 may consist of polyethylene. The plunger housing 15 need not be transparent and may consist of a self-lubricating plastic such as Delrin which is an acetal. The plunger cap 14 may again consist of Lexan. The trip cam 72 may also consist of Delrin.

If desired, a vacuum tank 90 may be connected to one of the vacuum hoses 23 as shown schematically and this in turn may be connected to various work areas, for example by a hose 89.

Hexagonal bore holes 91 may be provided in the housings 15 and 16 for securing the pump to a fixed support.

The operation of the pump of FIG. 1 will now be described. Initially the plunger 73 is in the position shown in FIG. 1. In other words, the pressure of spring 76 pushes the plunger disk 73 rearwardly thus keeping the opening 32 free. Accordingly, air pressure applied through hose 25 flows through bore 30, opening 32, conical portion 35, reduced opening 36 into venturi 12. This will cause a reduced pressure at the point 48 thus opening check valve 52. The air is now capable of flowing from plenum 22 through hose 57 into the bore 50 and out of the venturi tube 12. The air at reduced pressure is available from hose 65 and may be stored in the low gas pressure reservoir 66 which may also be provided with a suitable check valve such as shown at 52.

As the vacuum in the plenum 22 reaches a predetermined low pressure, the differential air pressure will be able to push the disk 73 of the plunger 11 forwardly, that is toward the right of FIG. 1 and the control portion 33 will block opening 32 thus shutting off the air supply.

This motion of the plunger 11 is accelerated by the snap action created by spring 81 and trip cam 72. In other words, the initial motion of the plunger 68 will eventually cause the spring to reach near dead center so that subsequent forward motion, toward the right of FIG. 1 is accelerated by the toggle action of the spring and cam.

The force of control spring 76 and the size of the disk 73 are so dimensioned that the plunger moves toward the right when a predetermined low air pressure has been reached in the plenum 22.

As the vacuum is used up by operation of the tools connected thereto or simply by leakage, the pressure in the plenum 22 increases again. When it has reached a predetermined upper value again determined by the force of spring 76 and the size of the disk 73, the reverse action takes place, that is the plunger 11 moves rearwardly, that is toward the left of FIG. 1 because the air pressure differential has been reduced. Again the motion is accelerated by the snap action or toggle action of spring 81 and trip cam 72. The off action, that is the movement of the plunger 68 into the position of FIG. 1, is helped by the provision of the semicircular recess 80 in the two legs of the cam 72. This is so because the recess 80 tends to retain the pin 71 on the plunger 11.

It will now be seen that the pump of FIG. 1 operates on demand and hence the compressed air is only used when it is needed. This helps to conserve the supply of compressed air and makes it possible for a person to carry a self-contained system including a compressed air supply and a pump. The pump will last for years. The system provides not only a vacuum but also a low gas pressure supply which may be used for other purposes. Since the system operates on demand the on and off times are variable; therefore the system becomes essentially a variable pulse width modulation control.

The snap action caused by spring 81 and trip cam 72 serves the purpose to prevent that the plunger 68 with its control portion 33 keeps the opening 32 partially open and partially closed. This would mean that the compressed air is wasted and that no positive control is obtained. Therefore, in order to obtain the on-off action of the vacuum pump of the invention the snap action is essential.

Figure 2:
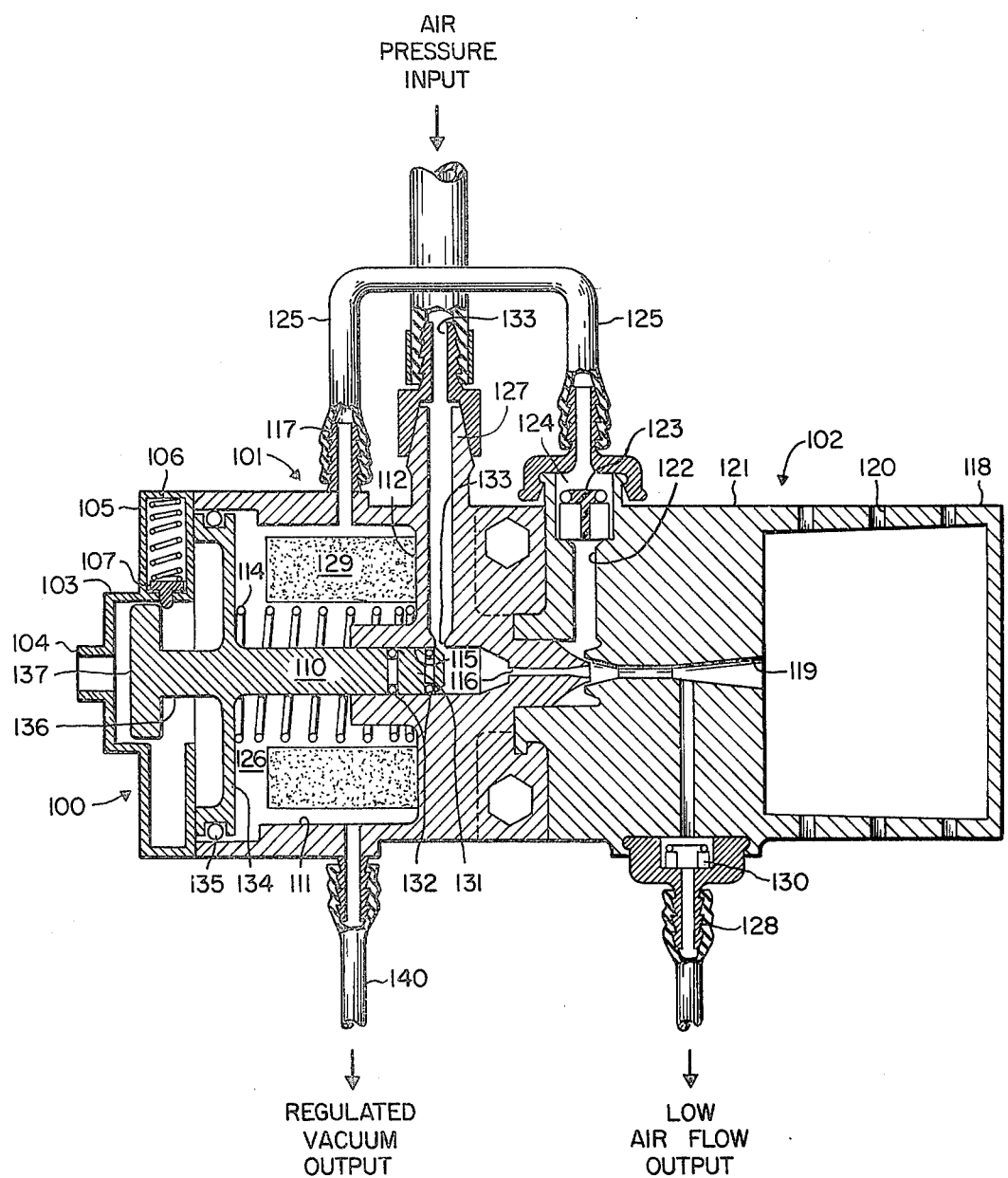
FIG. 2 is a cross-sectional view of another vacuum pump in accordance with the present invention.

Having now described the construction and operation of the preferred vacuum pump of the invention, reference is now made to FIG. 2 which shows a modified vacuum pump. This vacuum pump has a different arrangement for providing the required snap action of the demand control plunger. The pump of FIG. 2 again may have a three-part housing including plunger housing cap 100, a plunger housing 101 and a muffler and venturi housing 102. Thus the plunger cap 100 has a cylindrical portion 103 and may be open to atmosphere at a reduced rearward portion 104. The plunger cap has a cylindrical radial extension 105 for housing a spring 106 which urges a conical tip 107 against the plunger 110. Its operation will be subsequently described.

The plunger housing 101 has an outer cylindrical portion 111 for receiving the plunger 110. It has a disk-like forward portion 112 against which bears a main spring 114. It also has a central cylindrical portion 115 for the plunger 110 and which has a reduced opening 116 for connection to a venturi. A bore 116 connects to the venturi.

The muffler portion 102 has a forward end 118 with external openings 120 and which serves as a muffler. It may be provided with sound deadening material not shown. Its main body 121 forms a venturi 119 in the manner previously explained and connects to the bore 116 of the plunger housing. It has a first outlet 122 from which the vacuum is available. A check valve 123 may be provided in a connector 124 similar to those previously described. The connector in turn connects to a hose 125 which interconnects the outlet 122 with the outlet 117 forming a serrated nipple so as to create a vacuum in the plenum 126 formed in the cylindrical portion 111. A filter 129 may be provided in the plenum 126. The compressed air is applied to the inlet 127.

The air at reduced pressure is available from an air outlet 128 which may be closed by a check valve 130.

The plunger 110 may be somewhat similar to that of FIG. 1 and again has a forward portion 131 sealed by two O-rings 132 for opening or closing the air inlet opening 133. The forward portion 131 of the plunger 110 is made integral with a circular disk 134 sealed by an O-ring 135 against the cylindrical portion 111 of the plunger housing. Its rearward portion 136 has a disk-like termination 137 which cooperates with the spring biased detent 107.

The pump of FIG. 2 differs primarily from that of FIG. 1 by its different snap action provided by the detent 107 and the spring 106. Its operation may be described as follows. Due to the force of spring 114 acting against the plunger disk 134 the plunger is initially in its rearward position, that is in the left-hand position as viewed in FIG. 2. When compressed air having a pressure of say 80 – 100 psi is applied to the inlet 127 a vacuum is created at the outlet bore 122 in the manner previously described. This reduced pressure is applied by the hose 125 to the plenum 126. At the same time air at reduced pressure is avilable from the outlet 128 as long as the check valve 130 is open.

Eventually the pressure in the plenum 126 decreases to a predetermined value. This will now permit the disk 134 to move toward the right against the pressure of the main spring 114. The snap action is obtained by the enlarged disk-like portion 137 of the plunger being forced past the detent 107. This will now permit the control portion 131 to seal off the bore 133 thus cutting off the air supply. At that time the check valve 130 closes so as to preserve the low pressure air which may be maintained in the reservoir similar to the one shown in 66 in FIG. 1. At the same time the check valve 123 closes. The regulated vacuum output line 140 may also be connected to a vacuum tank such as shown at 90 in FIG. 1. As the vacuum is used up the pressure in the plenum 126 will slowly rise until it reaches a predetermined value. This is again determined by the force of main spring 114, the size of the plunger disk 134 and the force of the spring biased detent 107. Eventually, however, the plunger 110 will be able to snap rearwardly, that is to the left of FIG. 2 thus opening the bore 133 and the previously described action repeats again.

It should be noted that the embodiment of FIG. 1 has certain advantages over that of FIG. 2. In other words, the plunger 110 of the embodiment of FIG. 2 must overcome the relatively strong force of the spring biased detent 107 to move left or right. This additional force is wasted, that is it requires an additional supply of compressed air. Otherwise, however, the operation of the vacuum pump of FIG. 2 is basically identical with that of FIG. 1. It is again controlled by demand and provides variable on and off periods analogous to a variable pulse width modulation system.

The parts of the pump of FIG. 2 may consist of the same materials as corresponding parts of the pump of FIG. 1.

Referring generally to the remaining FIGS. 3 – 10, there are described various embodiments of the present invention making use of the vacuum pump of FIGS. 1 or 2. In other words, the embodiments of FIGS. 3 – 10 complete the vacuum system of the present invention.

Figure 3:
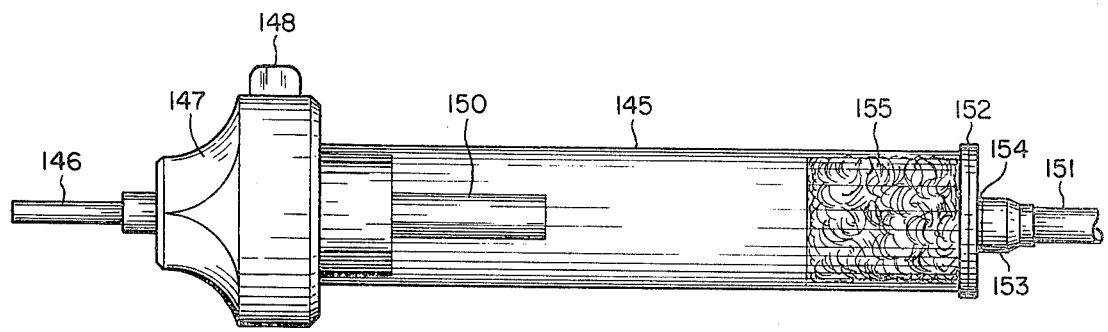
FIG. 3 is an elevational view of a desoldering tool which may be used with the vacuum pump of the present invention.
Figure 4:
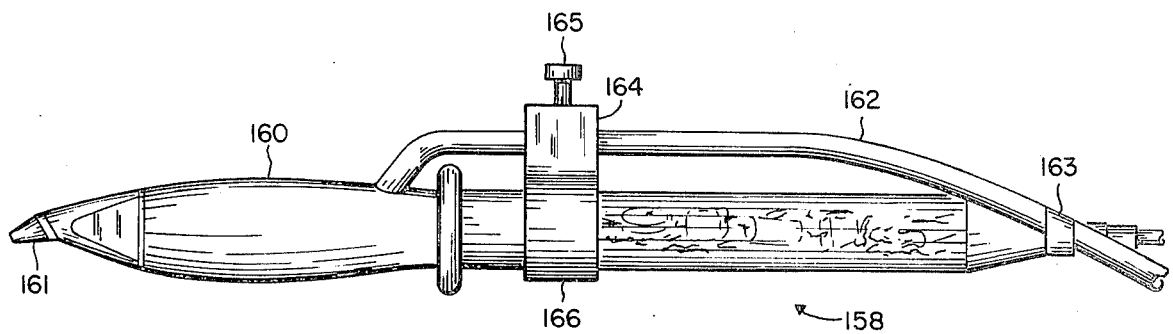
FIG. 4 is an elevational view of a vacuum desoldering tip which may be used with a temperature-controlled desoldering instrument.

Turning now specifically to FIG. 3, there is illustrated a desoldering tube made possible by the vacuum pump of the invention. The desoldering tube of FIG. 3 is characterized by its extremely fast reaction. It includes a cylinder 145 which preferably is transparent and consists of a plastic material capable of withstanding high impact. Disposed within or connected to the cylinder 145 is an operating tip 146 having a central opening for applying the vacuum. The tip 146 is connected to a connector member 147 having and on-off valve therein of conventional construction which is operated by depressing a button 148 which preferably is spring loaded. Hence when the button 148 is depressed, the valve is open to permit a vacuum to be applied to the tip 146 through an inner cylinder 150 connected thereto.

The vacuum may be applied by a hose 151 connected to a cap 152 which fits over the cylinder 145 and is sealed thereto. The hose 151 in turn is connected by a flexible cylinder 153 to a nipple 154 forming part of the cap 152.

The cylinder 145 provides a storage space for the vacuum and a filter material 155 may be disposed at its rear end for filtering, for example, solder drops that may be sucked in by the tool. Some of the solder may additionally be trapped inside the cylinder 150.

The operation of the desoldering tube of FIG. 3 will now be evident. The solder to be removed is first heated by a soldering instrument. After the solder has become liquid it is sucked in by the desoldering tube which can readily be held in one hand with the index finger operating the push button 148 by depressing it. Since the vacuum or the low pressure is stored in the cylinder 145 the action is extremely fast because as soon as the button 148 is depressed the liquid solder is sucked in in the usual manner. It should be noted that the desoldering tube of FIG. 3 is a strap-down system which is mainly suited for production work. Thus while the tool is very efficient and features a snap action switch it needs a permanent connection to a vacuum pump of the type previously disclosed.

Turning now to FIG. 4, this illustrates again a desoldering tip controlled by one hand and which may be attached to a soldering instrument such as a temperature controlled soldering instrument disclosed and claimed in U.S. Pat. No. 3,883,716 to the applicant which issues on May 13, 1975.

Thus referring again to FIG. 4, the soldering tool is generally shown at 158 and may be provided with a special desoldering tip 160 having a suction orifice at 161. The portion 160 may consist of stainless steel and a filter for retaining the sucked in solder. The hose 162 connects to the vacuum pump previously described and may be secured to the soldering tool 158 by a band or tape 163.

The attachment 164 through which the hose 162 extends includes an on-off valve which may again be operated by a spring biased button 165. It will again be evident that the soldering tube 168 may be held with one hand with the index finger operating the spring biased button 165. This instrument operates basically in the same manner as does that described in FIG. 3. It will be evident that the vacuum desoldering tip 160 may be removed when not needed. Also, it will be evident that the on-off valve and push button 165 may be detachably secured to the soldering instrument 158 by a snap action connector 166. The vacuum available from the hose 162 may also be used to exhaust the fumes due to the soldering or desoldering operation. This is one reason why it may be desirable to exhaust the manifold 42 to the outside.

Figure 5:
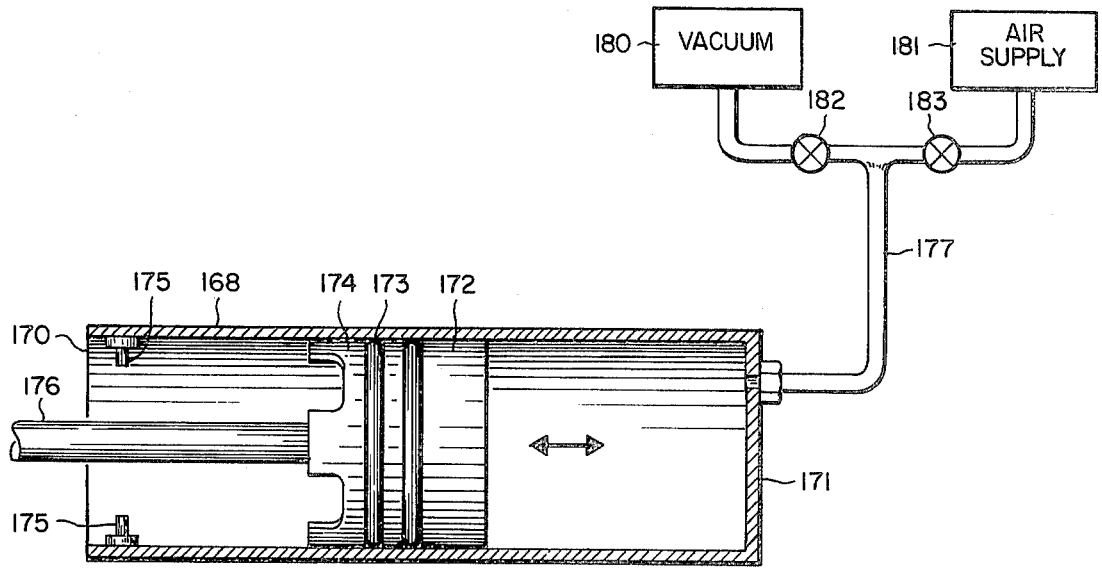
FIG. 5 is an elevational view of a power cylinder having forward and backward action without embodying springs and without requiring more than a single connection to a source of compressed air and another source of vacuum.
Figure 8:
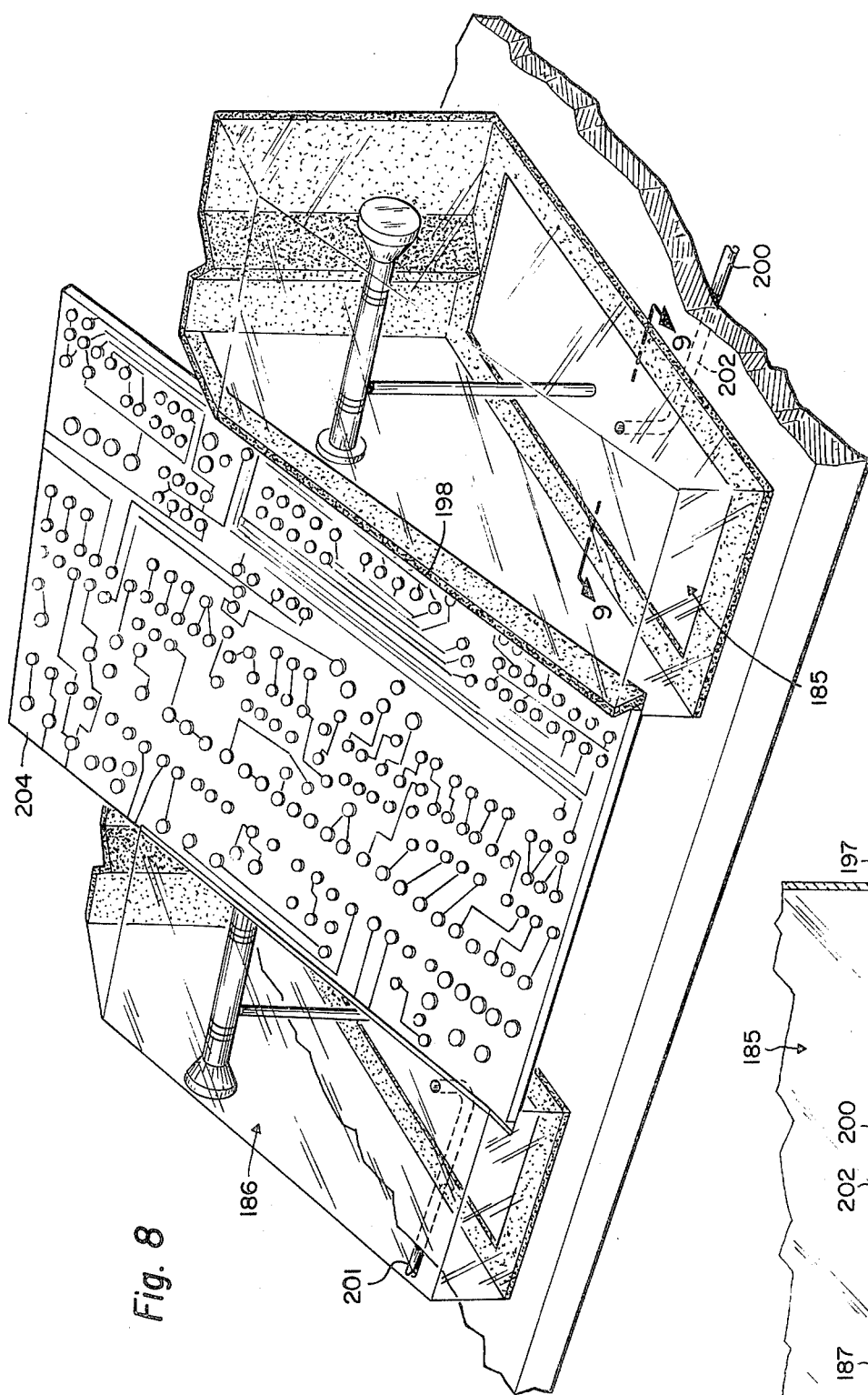
FIG. 8 is a view in perspective of two clamping blocks similar to those of FIG. 6 for gripping a component such as a circuit board and which are secured to a bench top by a vacuum connection provided in the bench top.
Figure 9:
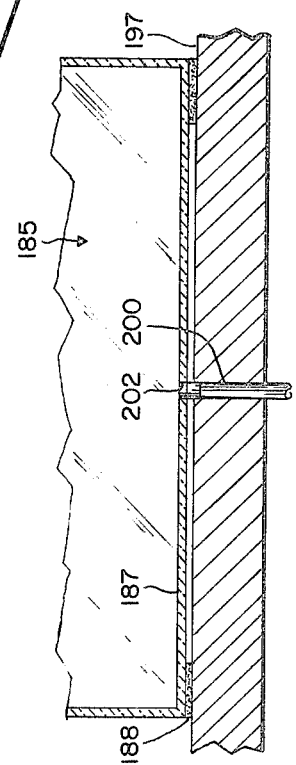
FIG. 9 is a cross-sectional view taken on line 9—9 of FIG. 8 to illustrate the clamping block, its seal and the vacuum connection to the bench top.

FIG. 5 to which reference is now made illustrates a power cylinder with forward and backward action. The power cylinder of FIG. 5 is characterized by a single piston which requires no spring and only a single connection.

The power cylinder of FIG. 5 includes a cylinder 168 which is open at its forward end 170 and closed at the other end by a disk 171. It features a plunger 172 having a seal 173, for example, in the form of an O-ring. Its forward portion 174 cooperates with a series of forward stops 175 in the forward portion of the cylinder 168. Its rearward portion abuts the disk 171 during rearward motion.

A central shaft 176 may be molded to or provided on the plunger 172 to operate a power tool or the like. The power cylinder is controlled by a single hose connection 177 which may either be connected to a vacuum supply 180 or to a compressed air supply 181 by the respective valves 182 or 183. The valves 182 and 183 may be hand operated or may be automatically controlled in accordance with the desired motion of the shaft 176.

The power cylinder of FIG. 5 provides double action by means of a single plunger having a single seal. Only a single connection to a source of vacuum or compressed air is required. Conventional power cylinders of this type require either two inlets or a spring. The spring in turn requires more power to overcome the spring pressure. Hence the power cylinder of FIG. 5 features a longer life, requires less power and is not subject to the metal fatigue of a spring.

The vacuum system of the present invention also permits the use of clamping fixtures which may be moved at will over any bench top or other flat surface and then secured to a desired spot by the use of a vacuum. Such a system has been illustrated in FIGS. 6 and 7. As shown here, there are two clamping fixtures or clamping blocks 185 and 186 which operate in the manner of a vise. The blocks 185 and 186 may, for example, consist of a plastic, transparent material having a flat bottom 187 provided around its edges with a resilient seal 188 such as a resilient gasket material permanently fixed to the bottom surface 187. The clamping fixtures may have a substantially triangular side view as shown in FIG. 6. The long vertical sides 190 may be provided with a substantially triangular depression 191 for securely gripping or grasping a component illustrated by way of example at 192.

Each of the blocks 185 and 186 is provided with a hose 193 which connects to a vacuum pump. The hose 193 in turn is connected by a cylinder 194 extending through the block to a hose or tube 195 which extends through the bottom surface 187. An on off valve not shown and disposed in the cylinder 194 is controlled by the push button 196 for connecting the tube 195 to the vacuum or disconnecting it therefrom.

In order to secure one of the blocks such as 185 to a bench top 197 the pushbutton 196 is pushed to connect the tube 195 to the source of vacuum. The vacuum will then evacuate the air space between the bottom 187 of the block and the bench top 197 to press the block 185 against the bench top 197 due to the atmospheric pressure.

The advantage of the clamping fixtures 185 and 187 are several. The clamping blocks may be put anywhere at convenience on the bench top. Furthermore, they can be conveniently moved closer together or further apart to accommodate components of different sizes.

It will be realized that the clamping fixtures of FIGS. 6 and 7, take the place of a conventional vise. However, a vise must be secured to the bench top and cannot readily be moved about. Also it takes some time to open and close the vise jaws to receive components of different sizes. Therefore, it will be realized that the use of the blocks 185 and 186 will considerably speed up the work and make it more convenient. It will also be realized that components or parts may be clamped between the lateral surface 198 of the blocks rather than against the vertical end surface 190.

Referring now to FIGS. 8 and 9, there are again shown the same two clamping blocks 185 and 186 previously discussed. However, the clamping blocks 185 and 186 may now be used in a different manner. Here vacuum hoses 200 and 201 extend through an opening or bore 202 in the bench top 197. Therefore by disposing one of the blocks such as 185 over the opening 202 a vacuum will be created under the bottom surface 187 so as to press the block 185 against the bench top and against the seal 188. The other block 186 may be similarly positioned over the opening of the hose 201. In this case a component such as a circuit board 204 may be pressed against the lateral surfaces 198 of the two blocks 185 and 186.

This system has a certain disadvantage in that the position of the two blocks 185 and 186 is determined to some extent by the position of the holes or openings such as 202 in the bench top. It is still possible to move the blocks somewhat as long as the opening 202 is below the bottom surface 187 of each block.

It is also feasible to apply the vacuum created by the vacuum pump of the invention to a suitable suction cup. Such suction cups may be applied to smooth surfaces for lifting, for example, a plate glass sheet or a metal appliance. Such vacuum cups may also be used at the boots or shoes of a worker to permit him to walk on a slippery surface, for example, on the wet wings of an airplane or to permit a diver to walk on a ship's hull or to hold him against such a hull underwater.

Figure 10:
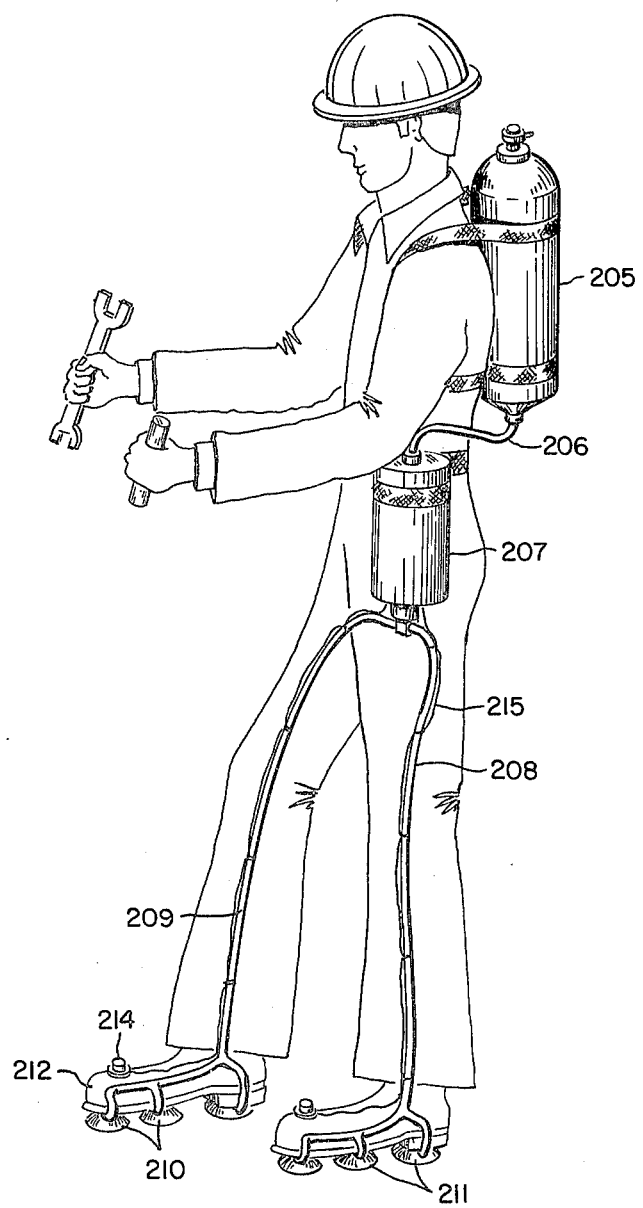
FIG. 10 is a view in perspective of a worker carrying the vacuum system of the present invention and with suction cups on his boots to provide a secure foothold for the worker on a slippery surface.

Such a system is illustrated in FIG. 10. Here a worker carries an air tank 205 on his back which is connected by a hose 206 to a vacuum pump 207 which may take the form of that illustrated in FIG. 1. By means of vacuum hoses 208 and 209 the vacuum pump 207 may be connected to two sets of suction cups 210 and 211 which may be secured each to one of the shoes or boots 212 of the worker.

Pressure sensors may be provided at 214 on the boot 212 to control the vacuum applied to the suction cups 211 by a hose 215. In other words, as the worker or diver straightens his boot to put it down on the surface the pressure sensor 214 will connect the vacuum to the suction cups 210 and 211 to provide a secure hold to any slippery surface.

Similarly the pressure sensors 214 will release the vacuum upon appropriate motion of the foot so that the worker can lift one foot off the surface and put it down at some other location.

The vacuum system of FIG. 10 is made possible by the vacuum pump of FIG. 1. In other words, because the vacuum pump only operates on demand it requires a relatively small air supply which can be readily carried by a person with air tank 205. Hence since both the required air tank 205 and the vacuum pump 207 are small and light weight they can readily be carried about by a worker going about his tasks.

There has thus been disclosed a vacuum pump having a mechanical feedback so that the pump operates only upon demand. It will maintain a vacuum between two predetermined limits. It has variable on and off times depending on the demand and is analogous to a pulse-width modulation system.

There have also been disclosed various vacuum systems cooperating with the vacuum pump of the invention and featuring, for example, desoldering tools, a double action power cylinder, movable vacuum clamps and suction cups for various purposes. These are made possible by the vacuum pump of simplified construction and light weight and by the fact that less compressed air is needed. The vacuum pump will not only supply a vacuum, that is it will reduce the air pressure but it will also provide a supply of air at relatively low pressure. This is made possible because the high pressure air is converted into low pressure air.

What is claimed is:

1. A demand operated vacuum pump comprising:
   a. a venturi tube;
   b. means including a passageway for supplying compressed gas to said venturi tube;
   c. means for forming a vacuum chamber;
   d. conduit means for exhausting the air from said vacuum chamber and connected to the throat of said venturi tube;
   e. unitary piston means disposed in said vacuum chamber and capable of moving from one end position to the other, said piston means having a valving portion capable by said moving of opening and closing said passageway to permit or prevent the compressed gas from entering said venturi tube;
   f. spring means associated with said piston means and disposed in said housing for urging said piston into one end position, while an existing vacuum tends to urge said piston in the other end position, thereby to close off the supply of compressed gas; and
   g. means coupled to said piston means for causing said piston means to rapidly snap from one end position to the other.

2. A vacuum pump as defined in claim 1 wherein said means coupled to said piston means for snapping said piston means consists of a cam having one end coupled to said piston means, pivot means for fixedly pivoting said cam, and a spring urging said cam into one or the other of its end positions by a toggle action.

3. A vacuum pump as defined in claim 1 wherein said means coupled to said piston means for snapping said piston means consists of a spring urged detent slideably positioned in the path of a portion of said piston means, said portion having a protrusion whereby motion of said piston means from one of its end positions to the other will force said protrusion to move past said detent.

4. A demand-operated vacuum pump comprising:
   a. a main housing;
   b. a venturi tube in said housing;
   c. means for supplying a gas at relatively high pressure to said venturi tube;
   d. a plenum in said housing;
   e. means for connecting said plenum to the throat of said venturi tube to reduce the pressure in said plenum, said means for supplying high pressure gas to said venturi tube including an opening;
   f. a unitary piston plunger movable in said housing, said plunger having a first valving portion for opening or closing said opening, thereby to permit said compressed gas to flow to said venturi tube or to block the gas, said plunger having a disk-like portion, one side of which is exposed to the pressure in said plenum;
   g. spring means for loading said plunger and urging it away from said opening, whereby said plunger can overcome said spring pressure when the pressure in said plenum is reduced beyond a predetermined value; and
   h. means coupled to said plunger for providing a snap action to move said plunger rapidly into and out of contact with said opening.

5. A pump as defined in claim 4 wherein said snap action means includes a trip cam having a pivot fixed to said housing, said trip cam having a portion in engagement with a portion of said plunger for moving said trip cam about its pivot to and fro, and spring means disposed between said housing and said trip cam for providing a toggle action.

6. A pump as defined in claim 5 wherein said trip cam has a semicircular detent engageable with a pin provided on said plunger for loosely interconnecting said trip cam to said plunger.

7. A pump as defined in claim 5 wherein said housing consists of a cap for housing said trip cam, a plunger housing for housing said plunger, and a muffler housing for housing said venturi tube.

8. A pump as defined in claim 4 wherein a vacuum tank is provided, and means for connecting said vacuum tank to said plenum.

9. A pump as defined in claim 4 wherein a check valve is provided in said means for connecting between said venturi tube and said plenum for disconnecting said venturi tube from said plenum.

10. A pump as defined in claim 4 wherein means is provided for interconnecting the outlet of said venturi tube to a low gas-pressure reservoir.

11. A pump as defined in claim 10 wherein a connection having a variable opening is provided between said venturi tube and said low gas-pressure reservoir.

12. A pump as defined in claim 10 wherein a check valve is provided between said venturi tube and said low gas-pressure reservoir.

13. A pump as defined in claim 4 wherein said housing has a cylindrical portion surrounding said venturi tube, and a sound deadening material in said cylindrical portion.

14. A pump as defined in claim 13 wherein said cylindrical portion is provided with a slot for retaining said sound deadening material.

15. A pump as defined in claim 4 wherein a plurality of vacuum connections are provided to said plenum.

16. A pump as defined in claim 4 wherein means for providing a snap action includes a detent slideable in said housing, a spring for biasing said detent and a portion on said plunger having a projection to depress said spring loaded detent upon motion to and from to uncover or cover said opening to provide said snap action.

* * * * *